(12) United States Patent
Seibt (10) Patent No.: US 11,708,165 B2
(45) Date of Patent: Jul. 25, 2023

(54) RAIL ARRANGEMENT FOR AN INNER SPACE OF AN AIRCRAFT

(71) Applicant: Airbus Operations GmbH, Hamburg (DE)

(72) Inventor: Christian Seibt, Hamburg (DE)

(73) Assignee: Airbus Operations GmbH

( * ) Notice: Subject to any disclaimer, the term of this patent is extended or adjusted under 35 U.S.C. 154(b) by 670 days.

(21) Appl. No.: 16/593,237

(22) Filed: Oct. 4, 2019

(65) Prior Publication Data
US 2020/0122840 A1 Apr. 23, 2020

(30) Foreign Application Priority Data
Oct. 19, 2018 (DE) ...................... 10 2018 126 012.1

(51) Int. Cl.
*B64D 11/06* (2006.01)
(52) U.S. Cl.
CPC ................................ *B64D 11/0696* (2013.01)
(58) Field of Classification Search
CPC .......... B64C 1/20; B64C 1/18; B64D 11/0696
See application file for complete search history.

(56) References Cited

U.S. PATENT DOCUMENTS

| | | | |
|---|---|---|---|
| 4,557,648 A | 12/1985 | Koch et al. | |
| 6,227,489 B1 | 5/2001 | Kitamoto et al. | |
| 7,857,259 B2* | 12/2010 | Baatz | B64C 1/20 244/118.6 |
| 8,172,195 B2* | 5/2012 | Fanucci | B63B 29/06 248/647 |
| 8,360,363 B2* | 1/2013 | Gonnsen | B64D 11/0696 52/506.04 |
| 8,870,119 B2* | 10/2014 | Baatz | B64C 1/20 244/118.6 |
| 9,284,036 B2* | 3/2016 | Kook | B64C 1/18 |
| 10,377,572 B1* | 8/2019 | Meidinger | B64F 1/368 |
| 10,549,859 B2* | 2/2020 | Movsesian | B64C 1/20 |
| 10,836,496 B2* | 11/2020 | Movsesian | B60N 2/06 |
| 11,286,050 B2* | 3/2022 | Grether | B64D 11/0696 |
| 2002/0021016 A1 | 2/2002 | Bergquist et al. | |
| 2003/0057326 A1 | 3/2003 | Medina et al. | |
| 2004/0195451 A1* | 10/2004 | Bentley | B64D 11/06 244/118.6 |

(Continued)

FOREIGN PATENT DOCUMENTS

DE 60207263 T2 7/2006
DE 102012218312 A1 4/2014

(Continued)

OTHER PUBLICATIONS

German Search Report for Application No. DE 10 2018 126 012.1 dated Sep. 12, 2019, 2 pages, (p. 2 categorizing cited references).

*Primary Examiner* — Philip J Bonzell
(74) *Attorney, Agent, or Firm* — Lerner David LLP (57) ABSTRACT

A rail arrangement for an inner space of an aircraft has a first portion having first rails for receiving passenger seats and having second rails which extend transversely relative to the first rails for receiving fittings. The rails are secured to a floor structure which is arranged in the inner space. The securing of the fittings is consequently decoupled from the floor structure.

19 Claims, 3 Drawing Sheets

(56) References Cited

U.S. PATENT DOCUMENTS

| | | | |
|---|---|---|---|
| 2007/0080258 A1* | 4/2007 | Baatz | B64C 1/20 244/118.6 |
| 2009/0166472 A1* | 7/2009 | Kook | B64C 1/18 244/129.1 |
| 2010/0065681 A1* | 3/2010 | Gonnsen | B64D 11/0696 244/129.1 |
| 2011/0068226 A1 | 3/2011 | Baatz et al. | |
| 2015/0145298 A1 | 5/2015 | Wottke et al. | |
| 2015/0367931 A1 | 12/2015 | Cullen et al. | |
| 2019/0092478 A1 | 3/2019 | Gilbert | |
| 2019/0118952 A1* | 4/2019 | Movsesian | B64D 11/0696 |
| 2019/0118953 A1* | 4/2019 | Movsesian | B64D 11/0696 |
| 2019/0118954 A1 | 4/2019 | Movsesian et al. | |
| 2019/0134762 A1* | 5/2019 | Mialhe | B64C 1/20 |
| 2022/0033054 A1* | 2/2022 | Fangmeier | B64D 11/0696 |

FOREIGN PATENT DOCUMENTS

| | | |
|---|---|---|
| DE | 102016111983 A1 | 1/2018 |
| DE | 102016111999 A1 | 1/2018 |
| WO | 0041911 A1 | 7/2000 |

\* cited by examiner

RAIL ARRANGEMENT FOR AN INNER SPACE OF AN AIRCRAFT

FIELD OF THE INVENTION

The invention relates to a rail arrangement for an inner space of an aircraft and an aircraft having an inner space and such a rail arrangement.

BACKGROUND OF THE INVENTION

In order to secure fittings in inner spaces of aircraft, a specific concept has been found to be advantageous. Passenger seats or passenger seat groups and monuments in cylindrical fuselage regions are generally arranged on so-called seat rails which extend along a longitudinal axis of the relevant inner space of the aircraft. The seat rails are additionally provided with a specific profile which enables correspondingly shaped securing elements to be received and locked. Such rails are generally secured at fixedly predetermined lateral positions.

Fittings in conical fuselage regions which are generally located in the front and rear regions of the aircraft with, for example, monuments installed therein, such as kitchens or washrooms, however, are generally arranged at dedicated individual securing locations.

In order to provide the individual securing locations, a floor structure always has to be adapted to the geometry of the monuments since the walls of the monuments depending on the size of the moments, design and function are located at different positions. To this end, in the relevant portions of the floor structure, individual reinforcements, displacements of the carrier position or additional carriers are required in order to provide the lower securing locations for the monuments at the different positions.

BRIEF SUMMARY OF THE INVENTION

It would therefore be advantageous to have available an arrangement in an inner space which a more flexible securing of fittings without having to carry out significant modifications to the floor structure. The omission of dedicated securing locations would be able to lead to more rapid and more flexible equipment of the inner space.

Aspects of the invention may provide a system, a method or an arrangement for an inner space of an aircraft, by means of which it is possible to carry out an individual, flexible, rapid and cost-effective equipment of portions which are located remote from simple passenger seat rows.

A rail arrangement for an inner space of an aircraft is proposed, having a floor structure which can be positioned in the inner space; a plurality of first rails which are arranged in a first portion of the floor structure parallel with each other and in a first extent direction of the floor structure and which are constructed to receive passenger seats; and a plurality of second rails which are arranged parallel with each other in a second portion of the floor structure and which are arranged in a second extent direction of the floor structure and which are constructed to receive securing means for securing fittings. The second extent direction extends transversely relative to the first extent direction. The second portion follows the first portion in the first extent direction. The second rails are fixed at positions of the floor structure which can be selected in the first extent direction.

There is consequently proposed a rail arrangement for an inner space of an aircraft in which an individualisation is very easily possible. The floor structure, which can be positioned in the inner space, may substantially correspond to the floor structure of conventional commercial aircraft. In particular, it may contain a series of carriers which are spaced apart from each other and which define a grid, which acts as a mechanical base for a floor in the inner space. Often the floor structure is provided as an integral component of the overall structure of the aircraft and the floor structure can also absorb lateral forces originating from the primary structure of the aircraft. In principle, the floor structure may have at least transverse carriers.

The first rails serve to receive passenger seats and may consequently correspond to the conventional floor rails or seat rails. They have at the upper side thereof an elongate, enclosed hollow space, wherein an upper boundary face of the hollow space is passed through by a slot, on which a plurality of openings which are spaced uniformly apart from each other are arranged. A securing means may be introduced into the hollow space, for example, through one of the openings, and be clamped to the upper side of the rail.

The first rails are preferably arranged continuously in the first portion and are arranged in a preferably consistent lateral position. The first rails are often interrupted by gaps only at locations where there are, for example, door regions.

At an end of the first portion in the extent direction of the first rails, a second portion is arranged. This has a plurality of second rails which are also spaced apart from each other and are arranged parallel with each other, but which extend transversely relative to the first rails. If, consequently, an elongate cabin is provided in a largely cylindrical fuselage, a second rail may extend transversely to the longitudinal direction of the fuselage. Such an arrangement enables the fittings to be secured at different positions along the second rails and consequently transversely relative to the first extent direction. Depending on the size and shape of the fittings which are intended to be secured thereto, different securing positions can consequently be assumed or provided. Dedicated securing positions formed in the floor for individual monuments are therefore required only in exceptional cases.

The securing of the second rails at different positions in the first extent direction further enables the installation location of the fittings to be adapted in the first extent direction and therefore in particular along the longitudinal axis of the inner space. The embodiment is further not limited to providing only a single second portion. Instead, it may be advantageous in the relevant inner space on the floor structure to provide a plurality of first portions and/or a plurality of second portions which have fittings. Furthermore, the second rails do not have to extend completely over the space available, but instead may also cover part-regions of an inner space or a floor structure. The securing of fittings may be decoupled from rigidly predetermined or complex-to-install securing locations on a floor structure. This enables a standardised, more rapid, individual and modular design of fittings even in a very late development stage and during the retrofitting or an upgrade of aircraft.

Preferably, the second rails each have an elongate rail member having a support face, an elongate hollow space formed in the rail member and two optional support flanges which are arranged at mutually opposing longitudinal sides of the rail member and which extend from the longitudinal sides flush with the support face outwards. The second rails may consequently have a rail member which is constructed in a similar manner to a floor or seat rail. It is not necessary to provide the rail member with openings which are distributed in a grid along the rail member. Instead, the hollow space of the rail member could be used to receive a securing element which can be clamped with the rail member. The support flanges extend outwards from the rail member. The support flanges consequently extend along the mutually opposed longitudinal sides. As a result of the support flanges, the surface-area with which the second rails can be supported increases. In addition, in this context, it should be taken into account that the second rails are arranged transversely relative to the longitudinal direction of the aircraft when the first rails concern floor rails for passenger seats. Higher loads, which are produced by heavy monuments in the longitudinal direction, can be absorbed by means of correspondingly sized optional support flanges. The rail member would be able to be supported with optimised introduction of force in the event of a load in the longitudinal direction in order to prevent rotation about a transverse axis as a result of the support flanges.

In an advantageous embodiment, the second rails are each clamped with a plurality of clamps to carriers of the floor structure. As a result of the clamping of the second rails to carriers of the floor structure, a completely variable position of the second rails on the carriers in the x direction is possible. The clamps enable a position to be selected, in particular along continuously extending faces of the carriers. The omission of the grid may consequently enable a very individual positioning.

If desired, however, a preferred screwing of the second rails to the floor structure can also be carried out.

It is advantageous for the clamps each to have a first member for pressing on a carrier and a second member for securing to a second rail, wherein the second member has a first securing means for receiving a second securing means which is coupled to the relevant second rail. Such clamps could, for example, be located at a lower side of the second rails and conform from below, for example, to a belt of a carrier. The clamps are intended to be secured in such a manner to the second rails that they enable secure clamping of the second rails.

The second member could have a bearing projection which can be placed on a hole in the second rail, wherein a diameter of the hole is less than an outer dimension of the bearing projection. It is thereby possible to carry out a particularly reliable, clamping connection with respect to the relevant carriers. The bearing projection enables the clamps to be placed on the second rail so that the bearing projection acts as a type of articulation. By clamping the combination of the first securing means and the second securing means, the clamp and in particular the first member can be pivoted about the bearing projection so that the spacing thereof with respect to the second rail can be adjusted. If a belt or another face of the carrier is located between the second rail and the first member, a secure clamping is carried out.

Preferably, one of the first securing means and the second securing means could be a hole or a threaded hole, wherein the other of the first securing means and the second securing means is a screwing means. A clamping can accordingly be carried out using a screwing means which in the simplest case is a bolt. The screwing means may be screwed into a nut or another element which has a threaded hole and which is located at a side of the second member remote from the second rail. However, the threaded hole may also be arranged directly in the second member so that by screwing in the screwing means, a clamping of the clamp can be carried out. On the clamp there may be a protective strip in order to protect the floor structure or a carrier which is located therein from damage and to optimise the frictionally engaging connection.

In an embodiment, the clamps are each provided with a barrel nut for receiving the screwing means. A barrel nut may, for example, have a cylindrical shape by means of which the barrel nut can be inserted into a hole of the clamp. A threaded hole, which extends perpendicularly relative to a longitudinal axis of the barrel nut, may receive the screwing means. As a result of such an embodiment, the barrel nut can be orientated precisely with respect to the tensile force when tightened.

In another embodiment which is also advantageous, the second rails each have a plurality of holes which are arranged with uniform spacing from each other in order to receive a screwing means and the bearing projection. As a result of the uniformly distributed holes which are spaced apart from each other, it is possible to reliably provide retention locations which are sequential in the second extent direction. It is consequently readily possible in addition to the continuous position along the first extent direction to provide a more or less finely graduated selection of positions in the second extent direction. A graduation in this direction can be tolerated since the fittings, such as monuments, in the installed state extend very clearly in the second extent direction and their securing to the grid can be readily adapted.

It is very advantageous for the second rails each to have an elongate slot which extends along the second extent axis, wherein a locking member can be introduced into the hollow space of the second rails and is coupled to a retention means which extends through the slot. The retention means may be a bolt or the like, which is guided from the corresponding fitted object to the locking member in order to secure the fitted object to the locking member and consequently to the second rail. The locking member serves in this instance to transfer the forces from the fitted object or the fittings to the second rails. A locking member could preferably be configured in such a manner that it can be displaced in the second extent direction, wherein the best possible use should be made of the space available between the longitudinal sides in the hollow space. However, it should be ensured in this instance that tilting is reliably prevented. This could be achieved by corresponding rounding of the locking member and by means of a corresponding fit.

In another embodiment, the locking member can be positioned so as to be able to be displaced in the hollow space. The locking member may in particular be secured in the hollow space by means of clamping. Before securely clamping, by means of the displacement, a position suitable for securing can be selected. The early positioning of the locking members enables precautions, such as corrosion protection measures, to be taken at an early assembly stage and allows a subsequent later rapid installation of the monuments.

In an advantageous embodiment, the locking member has resiliently supported clamping members which prior to assembly of the retention means fix the position of the locking member. The retention means may be constructed in a pin-like or round manner, for example, as a ball, and could have rounded ends which as a result of a resilient force at least lightly clamp the locking member inside the second rail. This can be carried out, for instance, by pressing the locking member on an upper boundary of the second rail. The clamping members are arranged offset with respect to the openings in the second rail.

The rail arrangement may further have covering strips for covering the second rails, wherein the covering strips are constructed so as to correspond to the second rails. In order to prevent the introduction of contamination or to prevent mechanical impairments, covering strips may be used. These may either be arranged flush on an upper side of the rail member or they can be inserted into the slot so that a vertical extent which is directed towards the slot is closed by the covering strip.

The invention further relates to an aircraft having an inner space and at least one rail arrangement which is arranged therein according to the above description. The aircraft may in particular be a commercial aircraft with a cabin which has a central aisle and two outer passenger seat regions. In principle, however, the rail arrangement according to the invention can also be used for larger aircraft which have cabins with two aisles.

The first portion may be arranged in a cylindrical region of the inner space, wherein the second portion is arranged in a tapering region of the inner space. In these portions, instead of or in addition to passenger seats there are often arranged larger structures, such as toilets and/or kitchen monuments, which are adapted in a flexible manner to the requirements of the aircraft operator. The rail arrangement according to the invention, by means of which a decoupling of the securing of such fittings from a floor structure is achieved is advantageous to this end. Consequently, an individual construction can be carried out much more quickly than when there is a requirement for the floor structure to always be individualised.

In another embodiment, second rails are arranged at least in a conically tapering region of the inner space in front of front doors or behind rear doors. In a particularly preferred manner, a region between a cockpit and a front (cabin) door exclusively has two rails. Also in a preferred manner, a region between a rear pressure bulkhead and a rear (cabin) door also exclusively has two rails.

Second portions may adjoin a first portion. The second portions may in an embodiment exclusively have two rails. However, it is also conceivable to configure transition regions in which both first rails and second rails are arranged. If the inner space is subdivided, for instance, by means of one or more aisles, on the one side of the aisle first rails may extend further than at another side of the relevant aisle. Second rails may, however, be arranged there. Such a transition region could substantially be located in or adjacent to a door region.

BRIEF DESCRIPTION OF THE DRAWINGS

Other features, advantages and possible applications of the present invention will be appreciated from the following description of the embodiments and Figures. In this instance, all the features described and/or depicted constitute per se and in any combination the subject-matter of the invention, including independently of their composition in the individual claims or back-dependencies. In the Figures, the same reference numbers refer to objects which are identical or similar.

DETAILED DESCRIPTION

Figure 1:
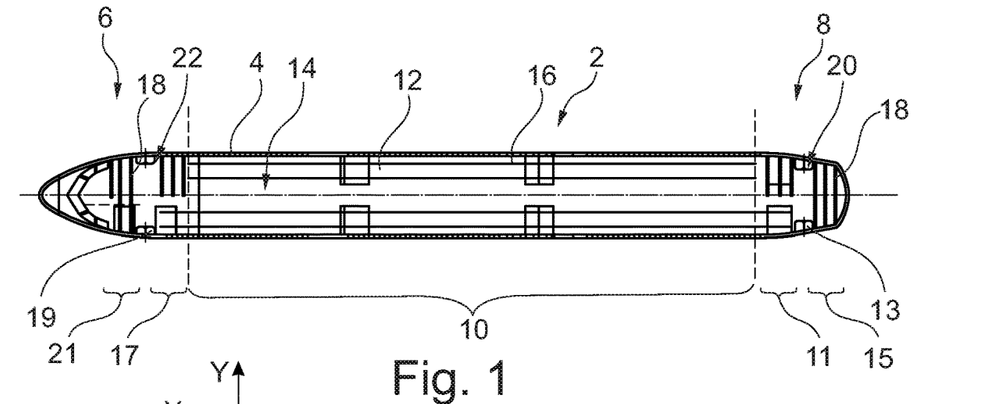
FIG. 1 shows a fuselage of an aircraft with first and second rails installed therein.

FIG. 1 shows an aircraft 2 in a simplified illustration in which the aircraft 2 is illustrated only in the form of a fuselage 4. The fuselage 4 has a nose 6 and a tail 8 between which a cylindrical fuselage portion 10 extends. In the fuselage 4 there is formed an inner space 12 which extends substantially over the entire fuselage 4. A floor structure which is used as a base for an internal structure is arranged there (not shown in this instance). There are arranged in a first portion 14 of the floor structure a plurality of first rails 16 which extend along a longitudinal axis x parallel with each other and spaced apart from each other. The first rails 16 are arranged substantially in the entire cylindrical region 10.

The first rails 16 may be constructed as floor or seat rails which, for example, have the so-called Douglas profile. Passenger seats may preferably be secured in inch increments to the first rails 16. The extent direction of the first rails 16 which is located, for example, parallel with the longitudinal axis x, is referred to as the first extent direction.

In regions outside the cylindrical region 10, that is to say, on the nose 6 and on the tail 8, there are arranged a plurality of second rails 18 which extend transversely relative to the first rails 16. The extent direction of the second rails 18 which is also referred to below as the second extent direction corresponds to the transverse axis y. These second rails 18 serve to receive larger fittings at variable positions. The portions in which the second rails 18 are arranged are also referred to below as second portions 20 and 22.

The front second portion 22 has a conically tapering region 21 which is exclusively provided with second rails 18 and which is arranged by way of example between front doors 19 and a cockpit. In a region between the conically tapering region 21 and the cylindrical region 10 there is arranged a transition region 17 in which some second rails 18 are located and in which a portion of the first rails 16 can extend. The second rails 18 in the transition region 17 could extend approximately only over a lateral cabin half.

In the rear second portion 20, this is constructed in a similar manner. Here, a conically tapering region 15 is arranged behind doors 13 in which exclusively second rails 18 are located. The conically tapering region 15 could extend as far as a rear pressure bulkhead (not shown). In a transition region 11, which extends between the doors 13 and the cylindrical region 10, however, there are second rails 18. A portion of the first rails 16 could extend into the transition region 11.

Figure 2:
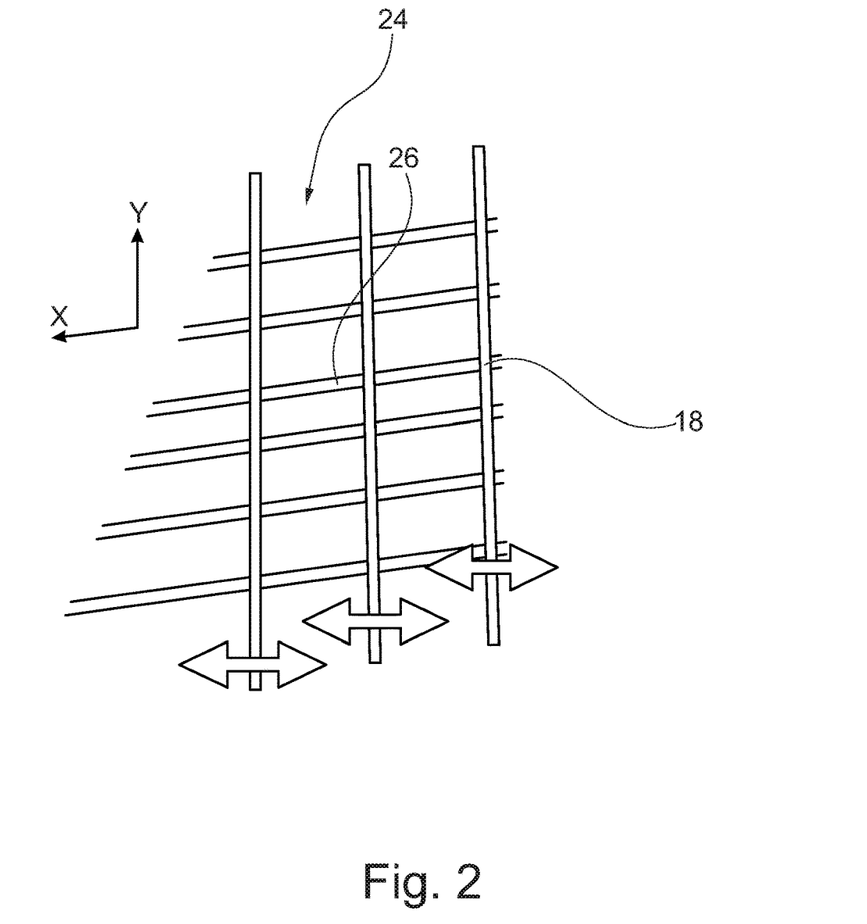
FIG. 2 shows a portion of a floor structure with second rails arranged thereon.

FIG. 2 is a slightly enlarged spatial and exemplary illustration of a floor structure 24. By way of example, the second portion 20 is shown on the tail 8. In this instance, a total of three second rails 18 are arranged on carriers 26 and can be positioned in a variable manner in the first extent direction, that is to say, by way of example, in the x direction. The arrangement of the fittings can consequently be decoupled from the carriers 26 and the second rails 18 can be configured in such a manner that they can be secured to all these fittings.

In principle, the second rails 18 may be securely arranged on the carriers 26 or, if required, on other elements of the floor structure 24. It is conceivable for a standardised equipment of the inner space 12 with second rails 18, which enable a standardised securing of extremely different fittings, to be carried out. The second rails 18 may, however, also be used for retrofitting already existing aircraft. In order to achieve the greatest possible degree of flexibility, the second rails 18 can be used in the longitudinal direction x at variable positions, which is indicated by the arrows in FIG. 2.

Figure 3:
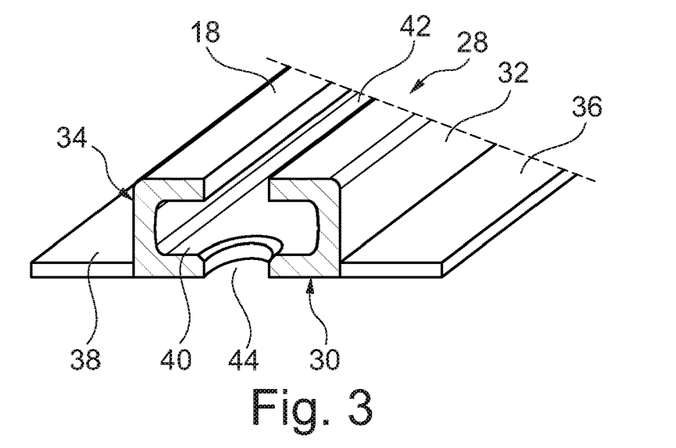
FIG. 3 is a schematic part-section of a second rail.

FIG. 3 is a simplified illustration of a second rail 18. In this instance, a rail member 28 which has a support face 30 can be seen. On the longitudinal sides 32 and 34 support flanges 36 and 38 are arranged and extend outwards from the outer edges 32 and 34. They terminate in this instance flush with the support face 30. Consequently, a very good support of the second rail 18 in order to prevent a rotation about the second extent direction is achieved.

The second rail 18 further has in the rail member 28 a hollow space 40 which extends preferably constantly in the second extent direction and which has at the side thereof facing away from the support face 30 a slot 42. As further illustrated below, all the locking members can be introduced into the hollow space 40 and can be used there for clamping. A hole 44 can be used to secure the second rail 18.

Figure 4:
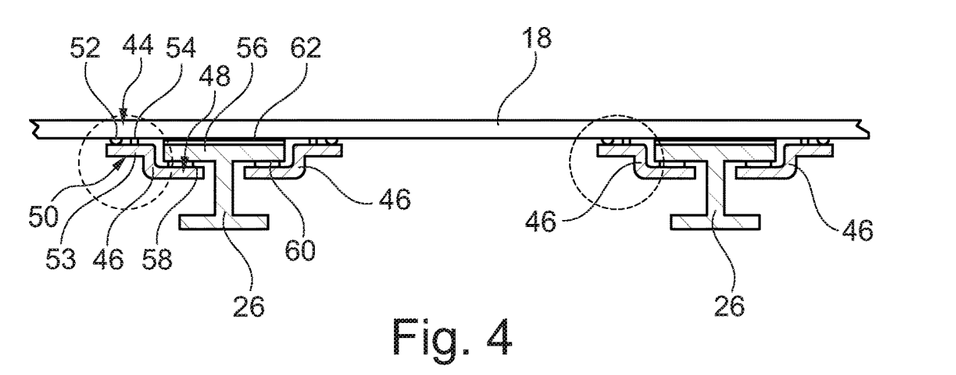
FIG. 4 shows a second rail clamped to two carriers.

In order to secure the second rails 18 to the carriers 26, secure clamping is advantageous. To this end, clamps 46 which are provided with a first member 48 and a second member 50 are proposed. Both members 48 and 50 extend parallel with each other and are offset with respect to each other over a relatively short path. For example, the second member 50 has a bearing projection 52 which extends outwards from the second member 50 and which can extend into a hole, for example, hole 44 (see also FIG. 3) of the second rail 18. The bearing projection 52 may, for example, be constructed at least partially spherically and consequently forms, for instance, a ball bearing or a joint head. The hole 44 has a diameter which is less than a width of the bearing projection 52. The clamp 46 may therefore pivot about the bearing projection 52 around the hole 44. In addition, in the second member 50, in a hole 53 as a first securing means, a screwing means 54, is provided as a second securing means which can be coupled to the second member 50 and the second rail 18. As a result of the screwing of the screwing means 54 the position of the clamp 46 around the bearing projection 52 can be selected so that the position of the first member 48 is also influenced. If a belt 56 of a carrier 26 is located between the first rail 18 and the first member 48, this belt can consequently be clamped by screwing the screwing means 54 between the clamp 46 and the second rail 18. The second rail 18 is then securely clamped with the clamp 46 on the carrier 26.

As shown in FIG. 4, a plurality of such clamps 46 can be used in order to clamp a second rail 18 to a plurality of carriers 26. In order not to impair the clamp 46, the belt 56 and the second rail 18 mechanically, protection layers 58, 60 and 62 are provided on the individual contact faces. These layers can be produced, for example, from a plastics material so that no notches or the like are produced on the connection faces during clamping.

Figure 5:
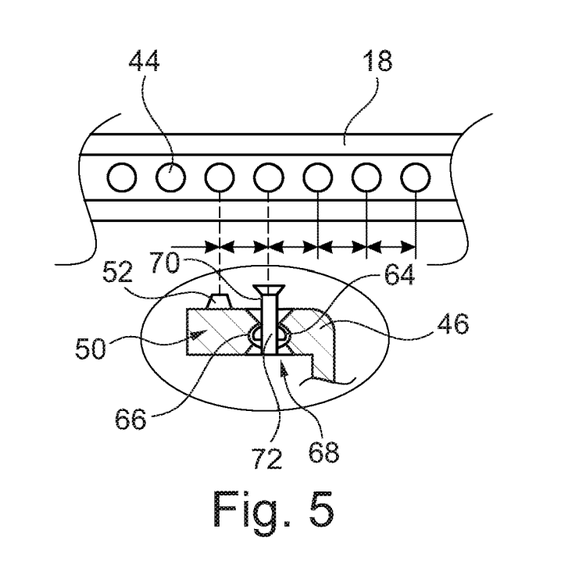
FIG. 5 shows a first variant of a second rail in addition to a clamp.

FIG. 5 shows a possible embodiment of a clamp 46 as a partial side view. Here, the bearing projection 52 which extends into one of the holes 44 of the second rail 18 can be seen. The second rail 18 is further shown as a plan view of the lower side thereof. This shows that there are a large number of holes 44 which are distributed in a grid relative to each other in the second extent direction. By way of example, the holes 44 may be spaced apart from each other by a distance of from 20 to 30 mm, preferably 24, 25 or 26 mm.

There is arranged in the clamp 46, for example, a barrel nut 64 which is located in a cylindrical hole 66 which expands slightly at one side at a lower side 68 in order to guide out a screwing means. A bolt 70 is guided as such a screwing means through the second member 50 and screwed into the barrel nut 64. As a result of this arrangement, the orientation of the bolt 70 can be varied about a rotation axis 72 of the barrel nut 64. If the bearing projection 52 is inserted into one of the openings 44 and the bolt 70 is inserted into a hole 44 which is adjacent thereto, consequently, the clamp 46 can be tensioned so that the first member 48 is tensioned against the belt 56. In this case, tensions within the clamp 46 can be prevented by the barrel nut 64.

Figures 6A, 6B, 7:
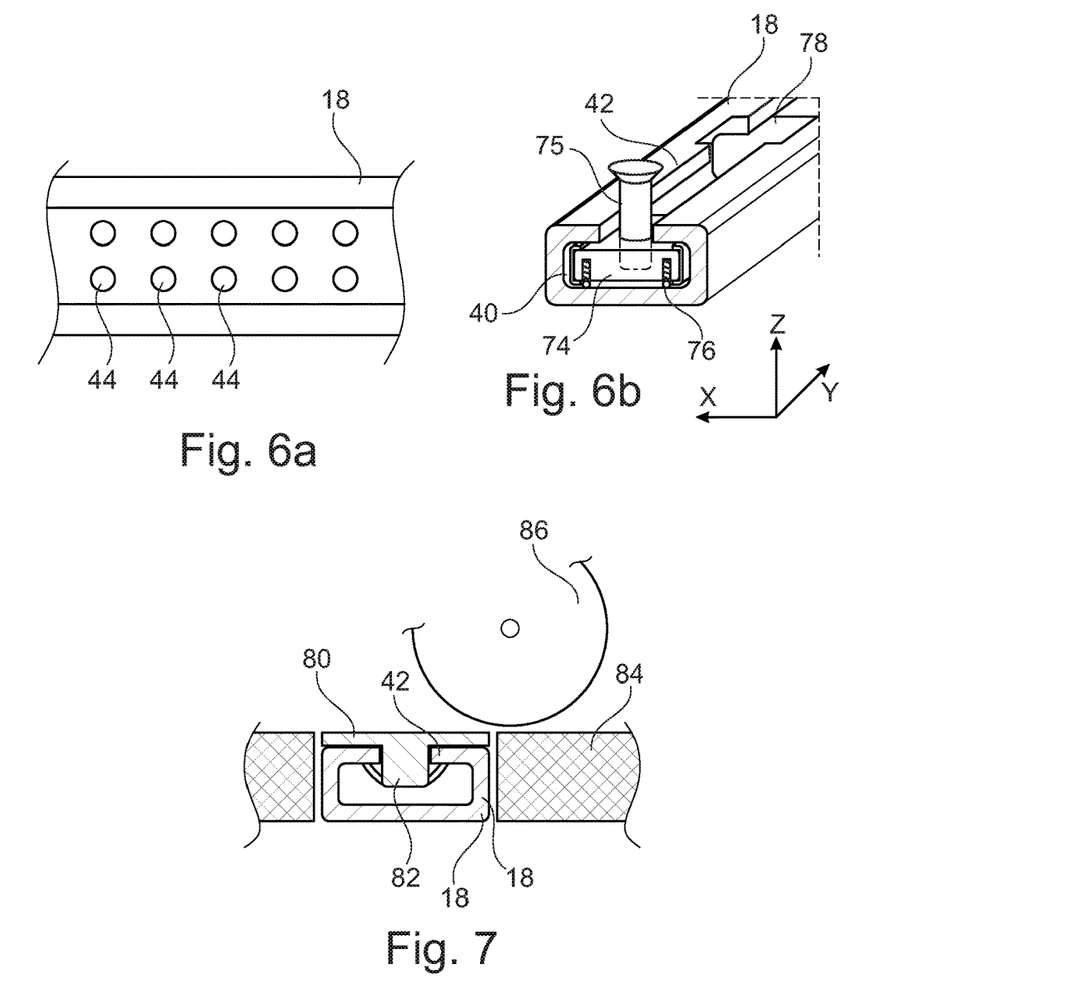
FIGS. 6a and 6b show a modification of a second rail from FIG. 5.
FIG. 7 shows a cover of a second rail.

As FIG. 6a demonstrates, other variants can also be used. For example, the second rail 18 could also have two adjacent rows of holes 44 which are also arranged beside each other in the second extent direction of the second rail 18. As a result, a rotation of a correspondingly formed clamp which has two adjacent bearing projections 52 and two screwing means 54 can be prevented.

As FIG. 6b shows, a locking member 74 can be introduced into the hollow space 40 of the second rail 18 as a securing means in order to be displaced along the slot 42. A retention means 75 in the form of a bolt which can be connected to the installation object which is intended to be fixed can project through the slot 42 into the locking member 74. The locking member 74 can be lightly clamped to the second rail 18 by means of spring-mounted clamping members 76 before the retention means 75 is tightened so that the introduction of the retention means 75 into the locking member 74 can be readily brought about. For example, locking members 74 can already be pushed to predetermined positions after the second rail 18 is produced. As a result of the light clamping by means of the clamping members 76, this assumed position can be secured. The assumed positions also remain maintained in the event of vibrations as a result of transport of the second rails 18 or when an aircraft with second rails 18 is moved fitting accessories.

The second rail 18 can further have a cutout 78 which is open upwards through the slot 42 and through which the locking member 74 can be pushed into the hollow space 40. Depending on the length of the second rails 18, a plurality of cutouts can also be arranged on a single second rail 18 so that a plurality of locking members 74 can be pushed into the hollow space 40 at different locations.

As FIG. 7 illustrates, there may be provided a covering strip 80 which can be placed on the second rail 18 and which can be locked in the slot 42 by way of example. To this end, there are provided engaging knobs 82 which allow the covering strip 80 to be engaged in the slot 42. A covering of a second rail 18 which is flush with adjacent floor coverings 84 can thereby be achieved. This allows in particular the second rail 18 to be stepped on or driven on, for example, by wheels 86 of a trolley.

Figure 8:
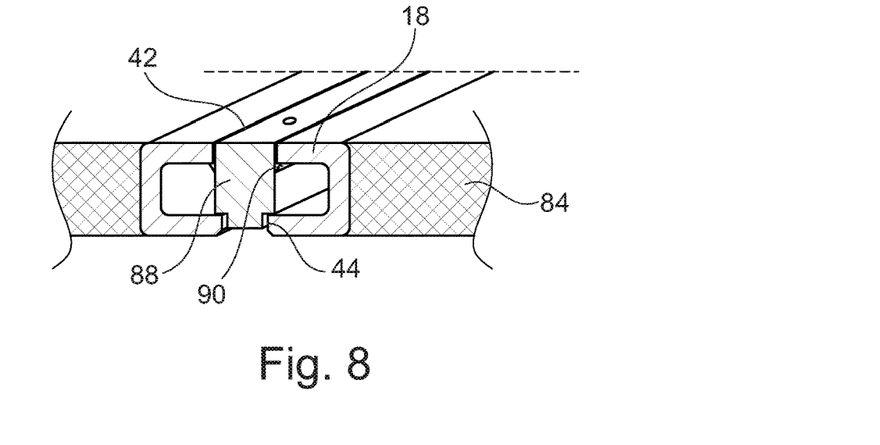
FIG. 8 shows a modification of a cover of a second rail.

FIG. 8 shows an alternative variant, in which an adjacent floor covering 84 terminates flush with the upper side of the second rail 18. Here, a covering strip 88 which can be inserted perpendicularly through the slot 42 and which can be fixed with engaging knobs 90 in the holes 44 can be used.

In addition, it may be noted that the term "having" does not exclude any other elements or steps and "a" or "an" does not exclude any large number. Furthermore, it may be noted that features which have been described with reference to one of the above embodiments can also be used in combination with other features of other above-described embodiments. Reference numerals in the claims are not intended to be considered to be a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS

2 Aircraft
4 Fuselage
6 Nose
8 Tail
10 Fuselage portion/cylindrical region
11 Transition region (tail)
12 Inner space
13 Rear doors
14 First portion
15 Conically tapering region (tail)
16 First rail
17 Transition region (nose)
18 Second rail
19 Front doors
20 Second portion
21 Conically tapering region (nose)
22 Second portion
24 Floor structure
26 Carrier
28 Rail member
30 Support face
32 Longitudinal side
34 Longitudinal side
36 Support flange
38 Support flange
40 Hollow space
42 Slot
44 Hole
46 Bracket
48 First member
50 Second member
52 Bearing projection
53 Hole/first securing means
54 Screwing means/second securing means
56 Belt
58 Protection layer
60 Protection layer
62 Protection layer
64 Barrel nut
66 Cylindrical hole
68 Lower side
70 Bolt
72 Rotation axis
74 Locking member
75 Retention means/bolt
76 Clamping member
78 Cutout
80 Covering strip
82 Engaging knob
84 Floor covering
86 Wheel of a trolley
88 Covering strip
90 Engaging knob
x Longitudinal axis/first extent direction
y Transverse axis/second extent direction

The invention claimed is:

1. A rail arrangement for an inner space of an aircraft comprising:
   a floor structure configured to be positioned in the inner space;
   a plurality of first rails arranged in a first portion of the floor structure parallel with each other and in a first extent direction (x) of the floor structure and constructed to receive passenger seats,
   only a plurality of second rails arranged parallel with each other in a second portion of the floor structure and arranged in a second extent direction (y) of the floor structure and constructed to receive securing means for securing fittings,
   wherein the second extent direction (y) extends transversely relative to the first extent direction (x),
   wherein the second portion follows the first portion in the first extent direction (x), and
   wherein the second rails are fixed at positions of the floor structure in the first extent direction (x).

2. The rail arrangement according to claim 1, further comprising covering strips for covering the second rails, wherein the covering strips are constructed so as to correspond to the second rails.

3. The rail arrangement according to claim 1, wherein each of the second rails has an elongate rail member having a support face, an elongate hollow space formed in the rail member and two support flanges arranged at mutually opposing longitudinal sides of the rail member and extending from the longitudinal sides flush with the support face outwards.

4. The rail arrangement according to claim 3,
   wherein each of the second rails has an elongate slot extending along the second extent axis, and
   wherein a locking member is configured to be introduced into the hollow space of the second rails and is coupled to a retention means extending through the slot.

5. The rail arrangement according to claim 4, wherein the locking member is configured to be positioned so as to be able to be displaced in the hollow space.

6. The rail arrangement according to claim 5, wherein the locking member has resiliently supported clamping members which prior to assembly of the retention means fix the position of the locking member.

7. The rail arrangement according to claim 1, wherein each of the second rails is clamped with a plurality of clamps to a plurality of carriers of the floor structure.

8. The rail arrangement according to claim 7,
   wherein each of the clamps has a first member for pressing on one of the plurality of carriers and a second member for securing the clamp to a corresponding one of the plurality of second rails, and
   wherein the second member has a first securing means for receiving a second securing means coupled to the corresponding one of the plurality of second rails.

9. The rail arrangement according to claim 8, wherein the second member has a bearing projection configured to be placed on a hole in the second rail, wherein a diameter of the hole is less than an outer dimension of the bearing projection.

10. The rail arrangement according to claim 8, wherein one of the first securing means and the second securing means is a hole or a threaded hole and wherein the other of the first securing means and the second securing means is a screwing means.

11. The rail arrangement according to claim 10, wherein each of the clamps comprises a barrel nut for receiving the screwing means.

12. The rail arrangement according to claim 9, wherein each of the second rails has a plurality of holes arranged with uniform spacing from each other to receive a screwing means and the bearing projection.

13. An aircraft comprising an inner space and at least one rail arrangement positioned therein, the at least one rail arrangement comprising:
- a floor structure configured to be positioned in the inner space;
- a plurality of first rails arranged in a first portion of the floor structure parallel with each other and in a first extent direction (x) of the floor structure and constructed to receive passenger seats,
- a plurality of second rails arranged parallel with each other in a second portion of the floor structure and arranged in a second extent direction (y) of the floor structure and constructed to receive securing means for securing fittings,
- wherein the second extent direction (y) extends transversely relative to the first extent direction (x),
- wherein the second portion follows the first portion in the first extent direction (x), and
- wherein the second rails are fixed at positions of the floor structure in the first extent direction (x), and
- wherein the second portion has a region exclusively provided with at least one of the plurality of second rails.

14. The aircraft according to claim 13, wherein the first portion is arranged in a cylindrical region of the inner space and wherein the second portion is arranged in a tapering region of the inner space.

15. The aircraft according to claim 14, wherein second rails are arranged at least in a conically tapering region of the inner space in front of front doors or behind rear doors.

16. The aircraft according to claim 13, wherein the second portion comprises a front second portion and a rear second portion.

17. The aircraft according to claim 16, wherein the front second portion comprises a first conically tapering region and a first transition region between the first conically tapering region and the first portion, and
- wherein the rear second portion comprises a second conically tapering region and a second transition region between the second conically tapering region and the first portion.

18. The aircraft according to claim 17, wherein the first conically tapering region is exclusively provided with at least one of the plurality of second rails,
- wherein the second conically tapering region is exclusively provided with at least one of the plurality of second rails.

19. The aircraft according to claim 17, wherein the first transition region is provided with at least a first one of the plurality of second rails and at least a first one of the plurality of first rails independent of the at least first one of the plurality of second rails, and
- wherein the second transition region is provided with at least second one of the plurality of second rails and at least second one of the plurality of first rails independent of the at least second one of the plurality of second rails.

* * * * *